R. B. WOLF.
PROCESS OF MAKING SULFITE LIQUOR.
APPLICATION FILED NOV. 17, 1909.
1,097,781.
Patented May 26, 1914.
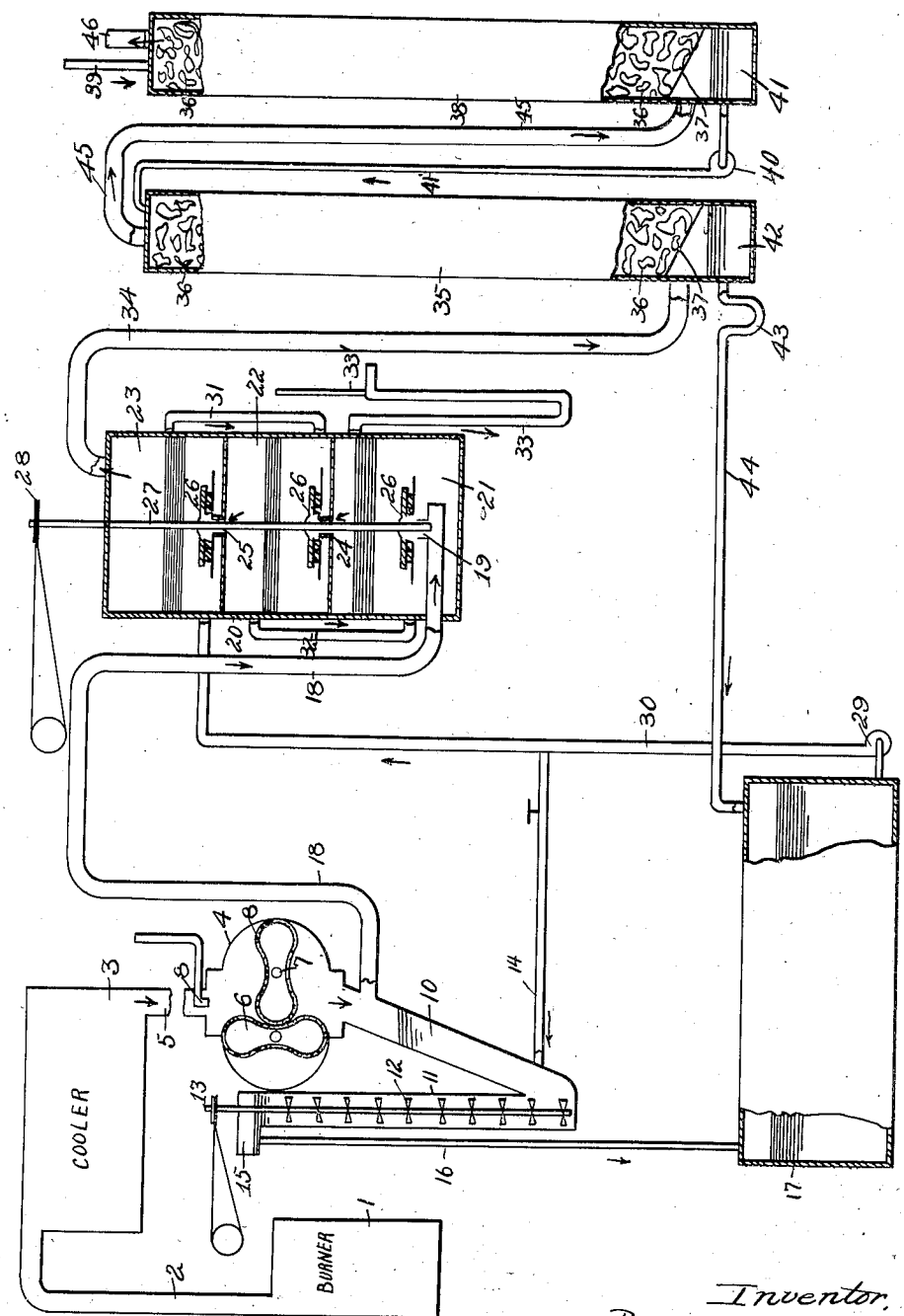
Inventor,
Robert B. Wolf

UNITED STATES PATENT OFFICE.

ROBERT B. WOLF, OF BERLIN, NEW HAMPSHIRE, ASSIGNOR TO BURGESS SULPHITE FIBRE CO., OF PORTLAND, MAINE, A CORPORATION OF MAINE.

PROCESS OF MAKING SULFITE LIQUOR.

1,097,781.      Specification of Letters Patent.      Patented May 26, 1914.

Application filed November 17, 1909. Serial No. 528,443.

*To all whom it may concern:*

Be it known that I, ROBERT B. WOLF, a citizen of the United States, residing at Berlin, county of Coos, and State of New Hampshire, have invented certain new and useful Improvements in Processes of Making Sulfite Liquor, of which the following is a specification.

This invention relates to the making of the acid for a sulfite process of paper pulp manufacture, and particularly to the production of an acid containing a bisulfite.

The particular apparatus discussed in this application is illustrative of my process as presented in a co-pending application, Serial No. 528,443.

This production of high grade pulp of strong fiber and proper whiteness demands an acid containing a maximum amount of sulfurous acid and a certain predetermined, relatively smaller amount of basic bisulfite. Only enough of this base is needed to perform these functions, and anything in excess of this amount simply increases the sulfur and lime used.

My present invention relates to the completion of the reactions and changes producing the bisulfite in the acid in advance of the time that the acid is to be raised to its maximum strength. This I secure by advancing certain of the chemical reactions and by inducing others to take place in such times, orders and relations as to make the final combination of the sulfur dioxid ($SO_2$) with water ($H_2O$) take place after all of the base has been converted to the bisulfite.

For the better illustration of the principles of my invention which I will more fully set forth in the specification which follows, I will discuss as an illustrative example the formation of the acid element of sulfite pulp manufacture using a calcium base.

In my method, as I have stated, I advance certain of the reactions, particularly the formation of a basic sulfite, and introduce it in the acid system in such a manner as to facilitate and hasten the ultimate completion of the sulfites prior to the final reactions of the acid combination.

To make my invention clear I will now describe its practice in the formation of an acid containing calcium bisulfite for use in production of paper pulp by the sulfite process. In connection with this I have shown in the accompanying drawing a system in which I have indicated the necessary apparatus.

Throughout specification and drawing like reference numerals are employed to indicate corresponding parts.

I first burn sulfur or sulfurous ores ($SO_2$) preferably under a slight vacuum or at most not more than atmospheric pressure. I then cool the gas in the usual manner in coolers 3. I then treat the gas initially with lime water, preferably a fresh or unused lime water. This I find is advantageously accomplished by spraying the lime water into the gas during an agitation of the gas and spray. For example, I inject fresh lime water through nozzles 8 into a blower 4 in which agitators 6 are turning. The resultant liquid will contain a considerable amount of calcium monosulfite, with possibly some sulfate of lime formed by $SO_3$ in the gas, and this I conduct to the lime tank for subsequent use after mechanically separating the solution and gas. The former falls in the bent foot 10 of a tube 11 stirred by agitators 12 from which it spills through a pipe 16 to the tank 17 which is fed with lime. From this initial treatment the sulfur gas ($SO_2$) in excess is forced under the pressure of the blower 4 through the pipe 18 and successively into a series of tanks 21, 22 and 23 between which the lime water containing calcium monosulfite passes in the opposite direction through the pipes 30, 31 and 32. These tanks may be of any number necessary. Ordinarily I have found three satisfactory. In the last tank 21 into which the liquid enters (the first through which the gas passes) the bisulfite will be present without interfering with the combination of the water and sulfurous acid gas, and the resultant acid will be strong and clear. By testing the solutions the amount of lime fed may be regulated to secure just the amount of bisulfite required in the liquor. These actions taking place under pressure are more complete and rapid than they have heretofore been, and as an excess of sulfurous acid gas is used the acid formed is much stronger.

In using the blower 4 there will be an excess of gas and a sulfurous acid gas discharge at the outlet 34 of the last tank 23. This excess I, therefore, treat as follows: I conduct through the pipe 34 the gas to towers 35 and 38 filled with lime stone 36, through which a water shower is falling through pipes 39 and 41'. The sulfurous acid gas, forming sulfurous acid, forms monosulfite which is deposited on the stone, and then being raised to bisulfite is ultimately washed down and is carried together with sulfurous acid in a solution which is pumped along by the pump 40 through the succeeding tower to the lime tank 17 where they react on the calcium hydrate forming calcium monosulfite.

In conclusion it might be well to point out that the time required to convert the monosulfite into the bisulfite is much greater than the time required for the conversion of the hydrated lime into the monosulfite, which reaction takes place almost instantaneously, due to the fact that the lime held in suspension is partially soluble in water and, as soon as the ions are removed by the action of the $SO_2$, the lime in suspension takes its place in the solution. We, therefore, have an ionic reaction. In the case of monosulfite, which is insoluble and also crystalline, there is no ionic reaction, for the action is upon the mass; also, this mass being crystalline, the speed with which the reaction takes place is necessarily slow. This explanation is made to show how essential it is to have the calcium hydrate mostly converted into the monosulfite before it enters the absorbing system.

The apparatus described and shown herein is claimed in my copending application No. 528,444, filed concurrently herewith.

It will be readily seen that various modifications in the materials and manner of handling may be made according to the system used or the results sought, all without departing from the spirit of my invention if within the limits of the appended claims.

What I, therefore, claim and desire to secure by Letters Patent is:—

1. The process of making sulfite liquor which consists in pumping the gas containing $SO_2$ into the absorption apparatus while adding a small amount of a liquid carrying a base partly in solution to the gas entering the pump, then allowing the gas to separate from the treating liquid after passing the pump, and then adding such liquid to the main body of basic liquid, and then treating the resulting basic liquid with said separated gas under pressure and on the counter current principle to produce the sulfite liquor.

2. The process of making sulfite liquor which consists in pumping the gas containing $SO_2$ into the absorption apparatus in which the basic liquid and the gas under pressure are systematically brought together on the counter current principle to produce sulfite liquor, treating the resulting weak gases with an absorbing liquid in the presence of the carbonated base and adding the liquid resulting from this step to the main body of basic liquid.

3. The process of making the acid of a sulfite process consisting in forcing the gas containing $SO_2$ into the absorption apparatus while adding a small amount of a base partly in solution to said gas, allowing said liquid to separate from the gas, adding said liquid to the main body of basic liquid then treating the resultant liquid with said separated gas under pressure on the counter current principle, treating the resulting weak gases with an absorbing liquid in the presence of a carbonated base and adding the liquid resulting from this step to the main body of basic liquid.

4. The process of making the acid of a sulfite process consisting in forcing the gas containing $SO_2$ into the absorption apparatus while adding a small amount of milk of lime to said gas, allowing said liquid to separate from the gas, adding said liquid to the main body of the basic liquid then treating the resultant liquid with said separated gas under pressure on the counter current principle, treating the resulting weak gases with water in the presence of limestone and adding the liquid resulting from this step to the main body of basic liquid.

5. The process of making the acid of a sulfite process consisting in employing a main body of basic liquid having initial basic sulfite present therein, in treating said basic liquid with gas containing $SO_2$ under pressure, by the counter-current principle of progression, in which progression the formation of bisulfite is secured in an early part of the liquid current, and a maximum strength of the gas under maximum pressure is maintained at an early part of the gas current, whereby the weakest gas meets liquid containing the greatest amount of uncombined base and the strongest gas encounters liquid containing substantially no uncombined base.

6. A process of making sulfite liquor which consists in maintaining a body of basic liquid, in forcing the gas containing $SO_2$ into an absorption apparatus in which the basic liquid and the gas under pressure are systematically brought together on the counter current principle to produce a sulfite liquor under an excess of gas which escapes therefrom, treating said escaping excess gas to form a liquid containing both combined and uncombined sulfurous acid, and adding said combined and uncombined sulfurous acid to the main body of basic liquid.

7. The process of making the acid of a sulfite process consisting in employing a main body of basic liquid having initial basic sulfite present therein, in treating the same with a gas containing $SO_2$ under pressure by the counter current principle of progression in which progression the formation of bisulfite is secured in an early part of the liquid current and gas of maximum strength under maximum pressure is maintained at an early part of the gas current, whereby the weakest gas meets the liquor containing the greatest amount of uncombined base and the strongest gas encounters the liquid containing no combined base, but with an excess of gas escaping from the treated liquid containing the greatest amount of uncombined base, and in treating said escaping gas to produce a liquid containing free sulfurous acid and sulfurous acid combined with a base, and in supplying said liquid thus formed to a main body of basic liquid first described.

In testimony whereof, I have affixed my signature in presence of two witnesses.

ROBERT B. WOLF.

Witnesses:
 EDMUND SULLIVAN,
 THOMAS W. ESTABROOK.